United States Patent Office 3,424,621
Patented Jan. 28, 1969

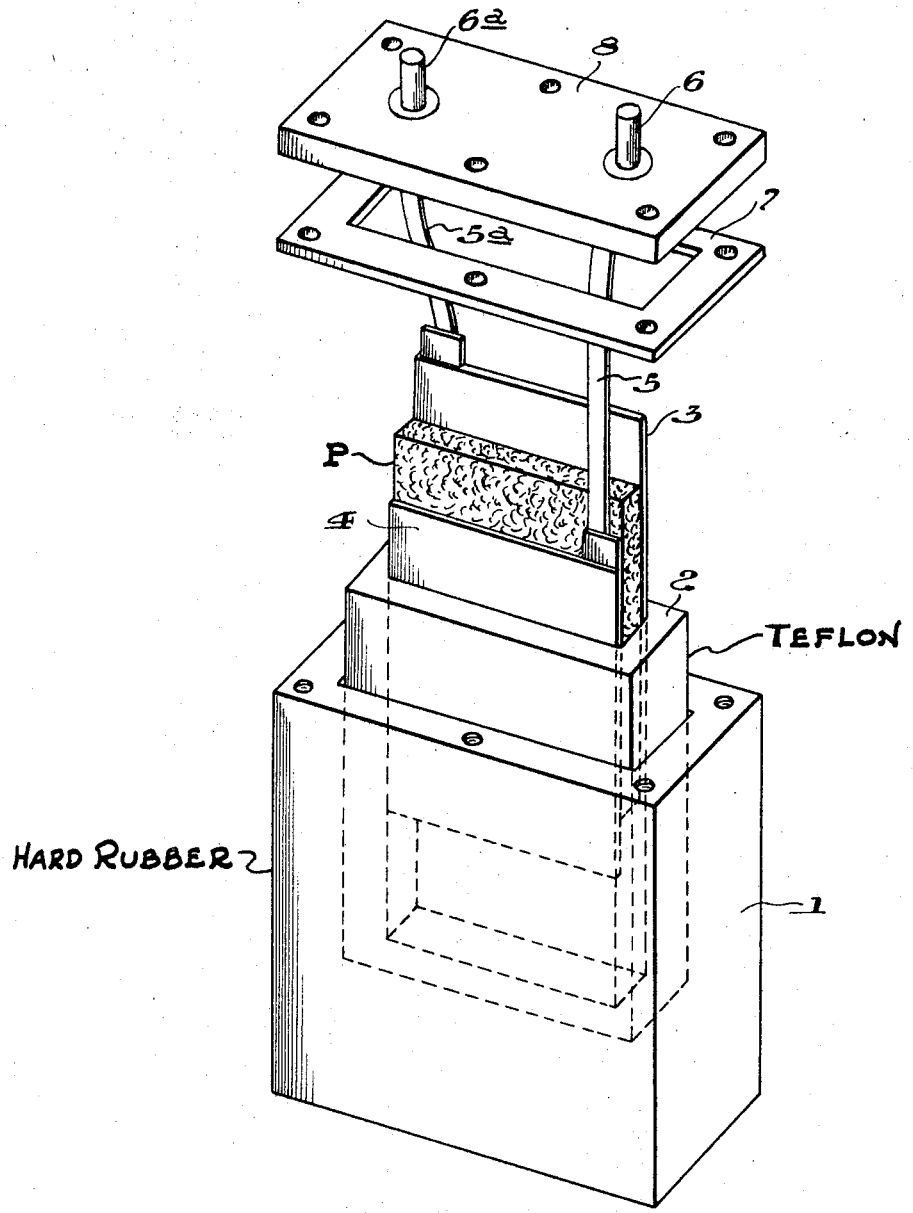

3,424,621
HIGH ENERGY PRIMARY CELL
Maxwell B. Rogers, Pikesville, Md., assignor to Catalyst Research Corporation, Baltimore, Md., a corporation of Maryland
Filed Dec. 29, 1965, Ser. No. 517,258
U.S. Cl. 136—100  8 Claims
Int. Cl. H01m 11/00

ABSTRACT OF THE DISCLOSURE

The primary cells of this invention comprise a positive electrode, a negative electrode, and as an electrolyte an anhydrous liquid hydrogen fluoride solution of a metallic salt which does not react with but is ionizible in the hydrogen fluoride. Lithium, calcium and magnesium are preferred as the negative electrode, while metallic fluorides and most suitably the higher fluorides of multivalent metals, are preferred as the positive electrode although this function may be supplied by other compounds such as metallic oxides insoluble in and unreactive with the electrolyte. These cells provide high energy output per pound of active materials at a high rate of discharge over a wide range of temperatures.

---

The chief object of this invention is to provide primary cells capable of high energy, or power, output, capable of supplying high watt hours output per pound of active material at a high rate of discharge, and which are adapted especially to use at very low temperatures without the necessity of applying auxiliary heat. These cells are also adapted to long time stand in the activated condition, especially at low temperatures and are also useful as reserve activation-type batteries.

A further object is to provide cells in accordance with the foregoing object which satisfactorily deliver high energy output over a wide range of temperatures and with a wide variety of positive electrodes.

Other objects will be discerned from the following specification.

The accompanying drawing is an exploded perspective view of one form of battery according to the invention.

The primary cells of this invention comprise a negative electrode, or anode, a positive electrode, or cathode, and an electrolyte composed of a solution in anhydrous liquid hydrogen fluoride (HF) of a metallic salt which is compatible, that is, not reactive, with the liquid and which ionizes in it.

Although anhydrous liquid HF is itself a poor conductor of electricity, it forms highly conductive solutions with salts of monatomic metals, which dissolve easily in it. For example, the specific conductivity of a 55% solution of KF in HF is 0.25 ohm$^{-1}$ cm.$^{-1}$. For many purposes I now prefer to use for this purpose one or more of the alkali metal fluorides, particularly potassium fluoride (KF), lithium fluoride (LiF) and sodium fluoride (NaF).

As the negative electrode I prefer to use the metals lithium (Li), calcium (Ca) and magnesium (Mg) although other metals not attacked by anhydrous liquid HF may be used for this purpose, examples being zinc (Zn), cadmium (Cd) and aluminum (Al). Alloys resistant to attack by these electrolytes may also be used as negative electrodes.

Metallic fluorides insoluble in and unreactive with the electrolyte constitute the preferred positive electrode materials, most suitably the higher fluorides of multivalent metals, especially ferric fluoride ($FeF_3$), manganic fluoride ($MnF_3$), cupric fluoride ($CuF_2$) and indium fluoride ($InF_3$). Examples of other positive electrode materials are $HgF_2$, $CdF_2$, $CoF_2$, $CoF_3$, $NiF_2$, $PbF_2$, $CrF_3$, $VF_3$, $VF_4$, $AlF_3$ and $ZnF_2$. Likewise, metallic oxides insoluble in and unreactive with the electrolyte may serve as positive electrodes, examples being manganese dioxide ($MnO_2$), chromic oxide ($CrO_3$) and tungstic oxide ($WO_3$). One or more of these compounds may be used to supply positive electrodes.

The cells provided by this invention may have a single negative electrode or a plurality of negative electrodes of the same or different metals. They may be in the form of unsupported sheet material. Alternatively, the negative electrode metal may be pressed onto an expanded silver grid. Similarly, a single positive electrode material or a combination of two or more of them may be used to provide the positive electrode. The positive electrodes are prepared suitably by supporting them in coherent self-supporting form, as by intimately mixing one or more of the positive electrode compounds and silver powder, suitably in equal parts by weight, and pressing the dry intimate mixture into an expanded silver grid under high pressure, for instance about 7.5 tons per square inch. Of course, other ways of using the positive electrode materials will occur to those familiar with the battery art.

In assembling the cells of this invention experience has shown that magnesium and calcium do not show any activity when immersed in anhydrous liquid HF. However, there is some bubbling with lithium (presumably hydrogen) which may be due to residual water in the hydrogen fluoride or to moisture adsorbed on the lithium surface. This reactivity of lithium is greatly reduced or avoided when LiF is dissolved in the HF before contact with the lithium metal.

Despite the highly reactive and corrosive nature of HF, the electrolytes of this invention may be contained satisfactorily in a variety of materials suited for forming battery cases, examples being silver, copper, nickel, Monel, and stainless steel. Hard rubber is also satisfactory. Particularly suitable as cases for the primary cells of this invention are polytetrafluoroethylene (Teflon) and polychlorotrifluoroethylene (Kel-F, Fluorothene), which being thermoplastic are adapted, as known, to forming by molding or extrusion articles of various sizes and shapes which may act as battery cases. Where desirable electrode spacers and separators may be provided, and for this purpose polyethylene and polypropylene and the foregoing fluorocarbon polymers may be used. Where it is desired that the electrolyte be held against movement in the cell the electrolyte may be adsorbed in porous separators or spacers formed, for example, from polypropylene or polyethylene fibers.

The batteries of this invention may take a variety of forms and sizes depending upon the use to which they are to be put but the structural details will be well within the skill of those familiar with the battery art. The boiling point of anhydrous HF is about 19.5° C. at atmospheric pressure so that if these cells are to be used at lower temperatures no particular problem would be presented structurally apart from insuring that the electrolyte would be at a low enough temperature to avoid objectionable vaporization. At higher temperatures the vapor pressure of anhydrous HF is such that cells for use under those conditions will need cases tight enough to avoid leakage of HF. Thus, at 150° F. the vapor pressure amounts to a little more than four atmospheres but this presents no problem when it is realized that this pressure is much less than that encountered in the ammonia system, and for this purpose a variety of pressure-tight closure means and sealing means are available.

The accompanying drawing shows by way of example one form of battery that may be used in the practice of the invention. It comprises a hard rubber case 1 which receives a cell unit 2 of Teflon in which there are mounted a positive electrode 3 of $MnF_3$ and a negative electrode 4 of Li separated by a porous body P of polyethylene saturated with a solution of LiF in anhydrous liquid HF. Electrode 3 is connected electrically by a lead 5a to a terminal 6a, and electrode 4 is similarly connected by a lead 5 to a terminal 6. When cell unit 2 is disposed in the case 1 the battery is made pressure tight by a Teflon gasket 7 seated between the top of case 1 and a cover 8. Tight closure is achieved by screws, not shown, associated with threaded openings in, respectively, the cover, the gasket and the case.

As evidencing the characteristics of cells in accordance with this invention reference may be made to tests in which positive electrodes were prepared from $CuF_2$, $FeF_3$, $InF_3$ and $MnF_3$ in the manner described above. The individual electrodes were mounted with sheet lithium in an electrolyte of a saturated solution of LiF in anhydrous liquid HF, in a copper case surrounded by an outer jacket of ice and water to provide a temperature of 0° C. in the cells. The electrodes had an area of 10 sq. cm. The electrical performance of the cells was determined in a dry room where the relative humidity was about 2 percent to 3 percent or less, and the performance of the cells was recorded with a Brush recorder. The voltage and current in milliamperes (ma.) under various loads were as follows:

| Load | $CuF_2$ | $FeF_3$ | $InF_3$ | $MnF_3$ |
|---|---|---|---|---|
| OC* | 3.9 volts | 3.8 | 3.2 | 3.9. |
| 100 ohms | 3.85 (40 ma.) | 3.75 (40 ma.) | 3.1 (35 ma.) | 3.85 (40 ma.). |
| 10 ohms | 3.4 (350 ma.) | 3.2 (325 ma.) | 3.0 (300 ma.) | 3.6 (380 ma.). |

*Open circuit.

From this it appears that the open circuit voltage is independent of the cathode material; this may be ascribed to an F-Li electrode effect.

In another test conducted similarly using the couple Li/LiF-HF/$MnF_3$ the following results were obtained:

| Load | 32° F. 0° C. | −13° F. −25° C. | −58° F. −50° C. | −85° F. −65° C. | −103° F. −75° C. |
|---|---|---|---|---|---|
| OC | 3.9 volts | 3.9 | 3.9 | 3.8 | 2.7. |
| 100 ohms | 3.9 (50 ma.) | 3.9 (50 ma.) | 3.7 (45 ma.) | 3.4 (40 ma.) | 2.05 (30 ma.). |
| 10 ohms | 3.7 (390 ma.) | 3.6 (350 ma.) | 3.0 (300 ma.) | | |
| 5 ohms | 3.55 (735 ma.) | 3.4 (660 ma.) | | | |
| 3 ohms | 3.45 (1,100 ma.) | | | | |

It will be observed that the limiting voltage is approximately 3.9, and that it is constant within the range of loads and positive electrodes used. This is the decomposition potential of HF.

Another factor of significance with respect to the utility of the invention is that of high watt hours per pound of active material. Thus, a theoretical output that can be derived for a lithium-indium fluoride couple would be 512, as high as 780 in the case of the lithium-manganese fluoride couple, as high as 788 in the case of the lithium-ferric fluoride couple, and 737 in the case of the lithium-copper fluoride couple.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A primary cell comprising a negative electrode of a metal not attached by anhydrous hydrogen fluoride, an electrolyte of a solution in anhydrous liquid hydrogen fluoride of a monatomic metal salt soluble, compatible and ionizable in the liquid HF, and a positive electrode of the group metallic fluorides and oxides insoluble in and unreactive with the electrolyte.
2. A primary cell according to claim 1, said positive electrode being at least one metallic fluoride insoluble in and unreactive with the electrolyte.
3. A primary cell according to claim 1, said positive electrode being one or more higher fluorides of multivalent metals.
4. A primary cell according to claim 1, said salt being an alkali metal fluoride.
5. A cell according to claim 1, said negative electrode being one or more of the metals lithium, calcium, and magnesium.
6. A primary cell in accordance with claim 5, the positive electrode being a higher fluoride of a multivalent metal.
7. A primary cell according to claim 6, said positive electrode being one or more salts selected from the group $FeF_3$, $MnF_3$, $InF_3$ and $CuF_2$.
8. A primary cell according to claim 6, the electrolyte being a solution of LiF in anhydrous liquid HF, the negative electrode being lithium, and the positive electrode being $MnF_3$.

References Cited

UNITED STATES PATENTS

| | | | |
|---|---|---|---|
| 3,043,896 | 7/1962 | Herbert et al. | 136—154 |
| 3,132,972 | 5/1964 | Ludwig | 136—86 |
| 3,099,587 | 7/1963 | Chambers et al. | 136—86 |
| 3,297,482 | 7/1963 | Zimmer | 136—86 |
| 3,355,328 | 11/1967 | Meyers et al. | 136—100 |

OTHER REFERENCES

"Non-aqueous Solvents," Audrieth, 1953, p. 28.

WINSTON A. DOUGLAS, *Primary Examiner.*

C. F. LEFEVOUR, *Assistant Examiner.*

U.S. Cl. X.R.

136—83, 155